United States Patent
Jo

(10) Patent No.: US 11,634,154 B2
(45) Date of Patent: Apr. 25, 2023

(54) SYSTEM AND METHOD FOR DRIVING GUIDE

(71) Applicant: HYUNDAI MOBIS CO., LTD., Seoul (KR)

(72) Inventor: Jang Hyeon Jo, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 139 days.

(21) Appl. No.: 17/230,074

(22) Filed: Apr. 14, 2021

(65) Prior Publication Data

US 2021/0316750 A1   Oct. 14, 2021

(30) Foreign Application Priority Data

Apr. 14, 2020 (KR) .................. 10-2020-0045581

(51) Int. Cl.
*B60W 60/00* (2020.01)
*B60W 40/08* (2012.01)
*H04W 4/44* (2018.01)
*G06V 20/58* (2022.01)

(52) U.S. Cl.
CPC .......... *B60W 60/001* (2020.02); *B60W 40/08* (2013.01); *G06V 20/584* (2022.01); *H04W 4/44* (2018.02); *B60W 2554/4046* (2020.02); *B60W 2556/45* (2020.02)

(58) Field of Classification Search
CPC ...... B60W 50/14; B60W 30/16; B60W 30/14; G05D 1/0246; G06V 20/588; G06V 10/809; G06V 10/56; G08G 1/0965; B60R 16/00; B60R 21/00
See application file for complete search history.

(56) References Cited

U.S. PATENT DOCUMENTS

| | | | | |
|---|---|---|---|---|
| 10,300,894 | B2 * | 5/2019 | Rawashdeh | G06V 10/56 |
| 2009/0276135 | A1 * | 11/2009 | Hagemann | B60W 30/16 |
| | | | | 701/96 |
| 2017/0329337 | A1 * | 11/2017 | Kusano | G08G 1/0965 |
| 2019/0039619 | A1 * | 2/2019 | Natsumi | B60W 30/14 |
| 2020/0081450 | A1 * | 3/2020 | Creusot | G06V 10/809 |
| 2020/0135030 | A1 * | 4/2020 | Krivokon | G06V 20/588 |
| 2020/0148102 | A1 * | 5/2020 | Wang | G05D 1/0246 |

FOREIGN PATENT DOCUMENTS

| | | | | |
|---|---|---|---|---|
| JP | 2010049535 | A * | 3/2010 | B60R 21/00 |
| JP | 2015207035 | A * | 11/2015 | B60R 16/00 |
| KR | 10-2019-0061395 | A | 6/2019 | |

* cited by examiner

*Primary Examiner* — Yuri Kan P. E.

(74) *Attorney, Agent, or Firm* — NovoTechIP International PLLC

(57) ABSTRACT

Disclosed are a driving guide system and method. The driving guide system includes an input unit configured to receive signal information from a signal controller, a memory in which a driving guide program using the signal information is embedded, and a processor configured to execute the program. When it is not possible to recognize a traffic light using a camera, the processor determines a driving behavior using the signal information and then performs autonomous driving according to the driving behavior or provides a notification to a driver.

14 Claims, 9 Drawing Sheets

SYSTEM AND METHOD FOR DRIVING GUIDE

CROSS-REFERENCE TO RELATED APPLICATION

This application claims priority to and the benefit of Korean Patent Application No. 10-2020-0045581, filed on Apr. 14, 2020, the disclosure of which is incorporated herein by reference in its entirety.

BACKGROUND

1. Field of the Invention

The present invention relates to a driving guide system and method.

2. Discussion of Related Art

A technology that recognizes a surrounding situation using various sensors (radars, lidars, cameras, etc.) and maintains an autonomous driving state is mainly applied to autonomous vehicles.

A technology that recognizes signal information of a traffic light and performs autonomous driving according to the signal information or notifies a driver of the signal information using a multi-function camera (MFC) mounted on a vehicle windshield glass has been proposed.

However, when a large vehicle, such as a truck, is ahead at a signal intersection or when a bad weather condition such as fog, heavy rain, and heavy snow is encountered, it is not possible to recognize a traffic light using an MFC, and thus a signal state cannot be recognized.

SUMMARY OF THE INVENTION

The present invention has been proposed to solve the above-described problem and is directed to providing a system and method for accurately identifying the state of a traffic light ahead using vehicle-to-infrastructure (V2I)-based communication technology, providing driving-related information such as various safety warnings, and providing various driving guides through the collection of traffic information on a corresponding intersection and nearby intersections.

According to the present invention, there is provided a driving guide system including an input unit configured to receive signal information from a signal controller, a memory in which a driving guide program using the signal information is stored, and a processor configured to execute the program, wherein when it is not possible to recognize a traffic light using a camera, the processor determines a driving behavior using the signal information and then performs autonomous driving according to the driving behavior or provides a notification to a driver.

According to the present invention, there is provided a driving guide method including checking whether it is possible to recognize a traffic light using a camera, acquiring signal information through V2I communication when it is not possible to recognize the traffic light using the camera; and determining a driving behavior in consideration of the signal information and performing control according to the driving behavior.

DETAILED DESCRIPTION OF EXEMPLARY EMBODIMENTS

These and other objects, advantages and features of the present invention, and implementation methods thereof will be clarified through the following embodiments described with reference to the accompanying drawings.

The present invention may, however, be embodied in different forms and should not be construed as being limited to the embodiments set forth herein. Rather, these embodiments are provided so that this disclosure will fully convey the objects, configurations, and effects of the present invention to those skilled in the art. The scope of the present invention is defined solely by the appended claims.

The terminology used herein is for the purpose of describing particular embodiments only and is not intended to limit the invention. Herein, the singular shall be construed to include the plural, unless the context clearly indicates otherwise. The terms "comprises" and/or "comprising" used herein specify the presence of stated elements, steps, operations, and/or components but do not preclude the presence or addition of one or more other elements, steps, operations, and/or components.

Figure 1:
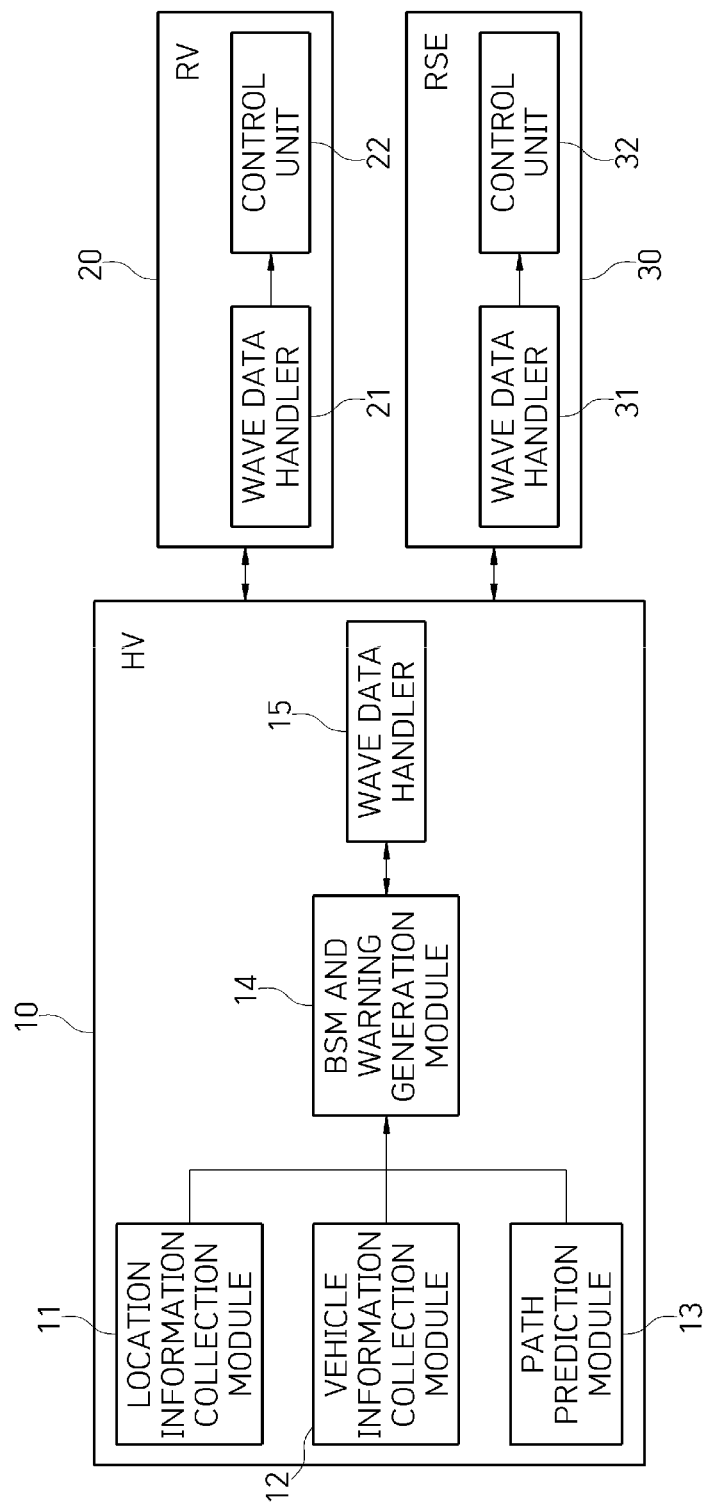
FIG. 1 shows a system configuration according to an embodiment of the present invention.

FIG. 1 shows a system configuration according to an embodiment of the present invention.

A location information collection module 11 of a host vehicle (HV) 10 acquires information regarding the currently driving road and driving lane through Global Positioning System (GPS), Global Navigation Satellite System (GNSS), and map information.

The location information collection module 11 acquires driving direction information (heading value: it is possible to know in what angular direction a vehicle is traveling when an angle and a reference point are 0 degrees) from the GPS and acquires information regarding a direction in which the host vehicle 10 is traveling through the driving direction information.

The location information collection module 11 utilizes the map information to determine the type of an intersection (a signal interaction or a non-signal interaction) that the host vehicle is currently approaching.

Also, the location information collection module 11 acquires type information of a road on which the host vehicle 10 is traveling (expressways, general roads, signal intersections, etc.).

The location information collection module 11 collects location information of a nearby vehicle (RV) 20, which includes all location information such as a front and left and right adjacent lanes in the same driving direction, a rear side, rear and left/right sides, an on-coming direction, an intersecting direction, and the like.

A vehicle information collection module 12 collects driving-related information (e.g., vehicle speed, angular speed, etc.) of the host vehicle 10 through in-vehicle Controller Area Network (CAN) communication in real time.

A route prediction module 13 processes the current speed, location information, and map information of the host vehicle 10 in real time and predicts at which point of a road the host vehicle 10 will be traveling after a certain time (e.g., 10 seconds) from the current time point.

The host vehicle 10 transmits predicted route information to a nearby vehicle or infrastructure through vehicle-to-vehicle (V2V) and vehicle-to-infrastructure (V2I) communication at regular intervals (e.g., 100 ms), and in this case, a broadcasting scheme may be used.

A basic safety message (BSM) and warning generation module 14 generates a BSM periodically (e.g., a period of 100 ms) during driving, and the BSM includes a vehicle location, state information, and various event information.

The BSM and warning generation module 14 determines whether to generate a warning based on BSM information received from a nearby vehicle 20.

A Wireless Access in Vehicular Environment (WAVE) data handler 15 broadcasts the generated BSM and receives the BSM transmitted from the nearby vehicle 20. As a result, the host vehicle 10 and the nearby vehicle 20 exchange vehicle information between each other in real time.

Also, when road side equipment (RSE) 30 is near the host vehicle 10, the host vehicle 10 exchanges information with the RSE 30 through V2I communication.

The BSM and warning generation module 14 delivers a current signal state and safe-driving-related information to a driver and provides a warning through a graphical user interface (GUI) on the basis of information exchanged with traffic lights (signal controllers and traffic information center) through V2I communication.

In this case, like intersection left or intersection right, different warning levels may be provided through separate indications (color change, etc.) of a vehicle's risk.

The warning system is automatically deactivated when the driver takes an appropriate action after the warning is generated (e.g., when the host vehicle 10 is decelerated through a brake or is out of a danger zone through steering after the generation of the warning).

A control unit 22 of the nearby vehicle 20 receives a BSM from the host vehicle 10 and determines whether to generate a warning.

A control unit 32 of the RSE 30 receives a BSM from the host vehicle 10 and delivers the BSM to a nearby vehicle and an information center if necessary.

Figure 2:
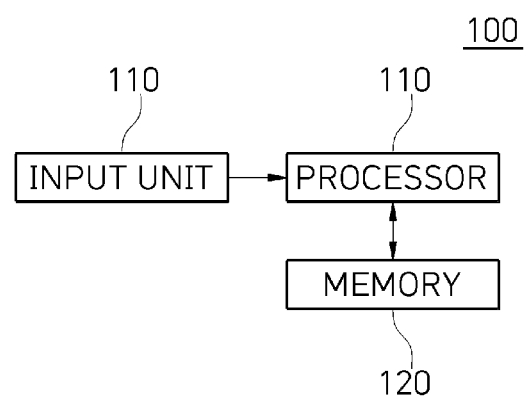
FIG. 2 shows a driving guide system according to an embodiment of the present invention.

FIG. 2 shows a driving guide system according to an embodiment of the present invention.

The driving guide system 100 according to an embodiment of the present invention includes an input unit 110 configured to receive signal information from a signal controller, a memory 120 in which a driving guide program using the signal information is embedded, and a processor 130 configured to execute the program. Also, when it is not possible to recognize a traffic light using a camera, the processor 130 determines a driving behavior using the signal information and then performs autonomous driving according to the driving behavior or provides a notification to a driver.

When it is not possible to recognize a traffic light using a camera, the processor 130 activates a V2I communication module for communication with the signal controller.

The input unit 110 receives, from the signal controller, the signal information including at least one of information on the currently turned-on signal, information on the remaining turning-on duration of the currently turned-on signal, and information on the remaining waiting time until a signal turning-on time for a vehicle's driving route.

The input unit 110 receives traffic-situation-ahead information including information on a traffic situation at a corresponding intersection from the signal controller.

The processor 130 determines a driving behavior using the signal information, the vehicle's driving information, and the traffic-situation-ahead information.

The processor 130 determines a driving behavior by additionally considering preset driver satisfaction information (e.g., related to vehicle tilt, rapid acceleration, or rapid deceleration).

The processor 130 determines a driving behavior using traffic-situation-ahead information including at least one of information on the number of preceding vehicles having the same driving route as the vehicle, information on behaviors of preceding vehicles, and information on an expected time at which the vehicle will pass through the intersection.

The processor 130 determines a driving behavior using signal information and traffic situation information received from a signal controller at a nearby intersection other than the current intersection.

Figure 3:
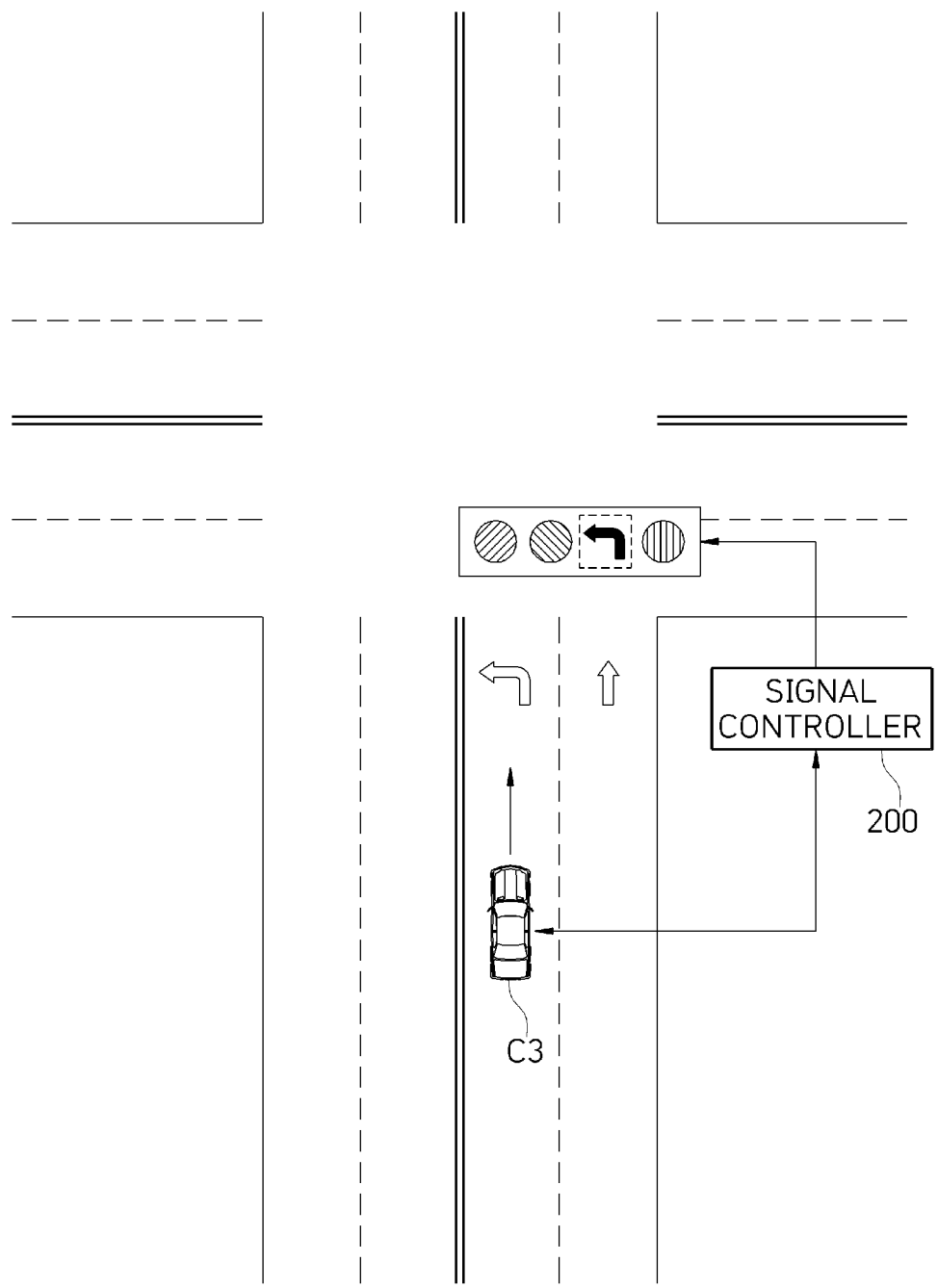
FIGS. 3 to 5 show a vehicle-to-infrastructure (V2I) communication situation between a signal controller and a vehicle according to an embodiment of the present invention.
Figure 4:
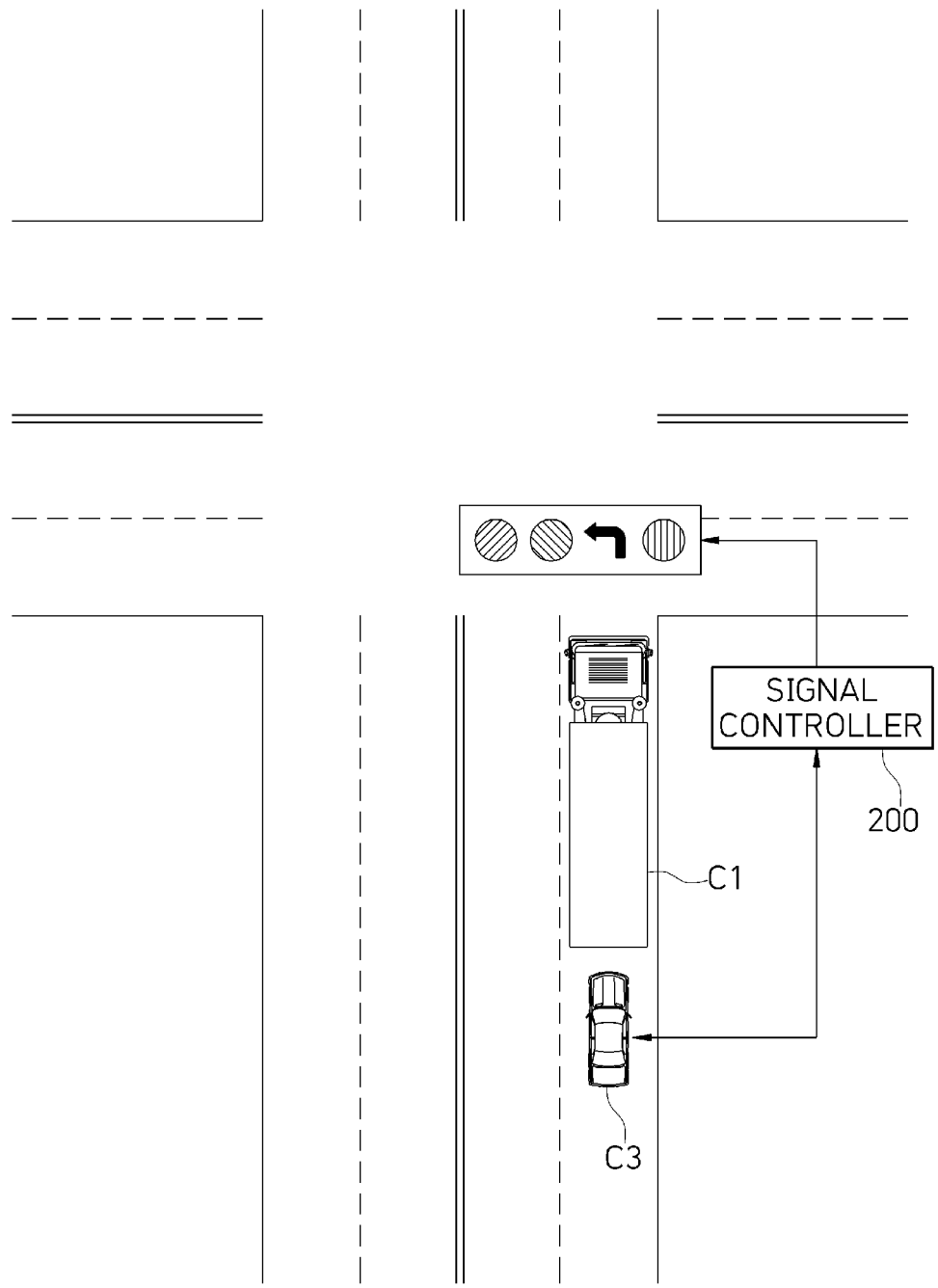
Figure 5:
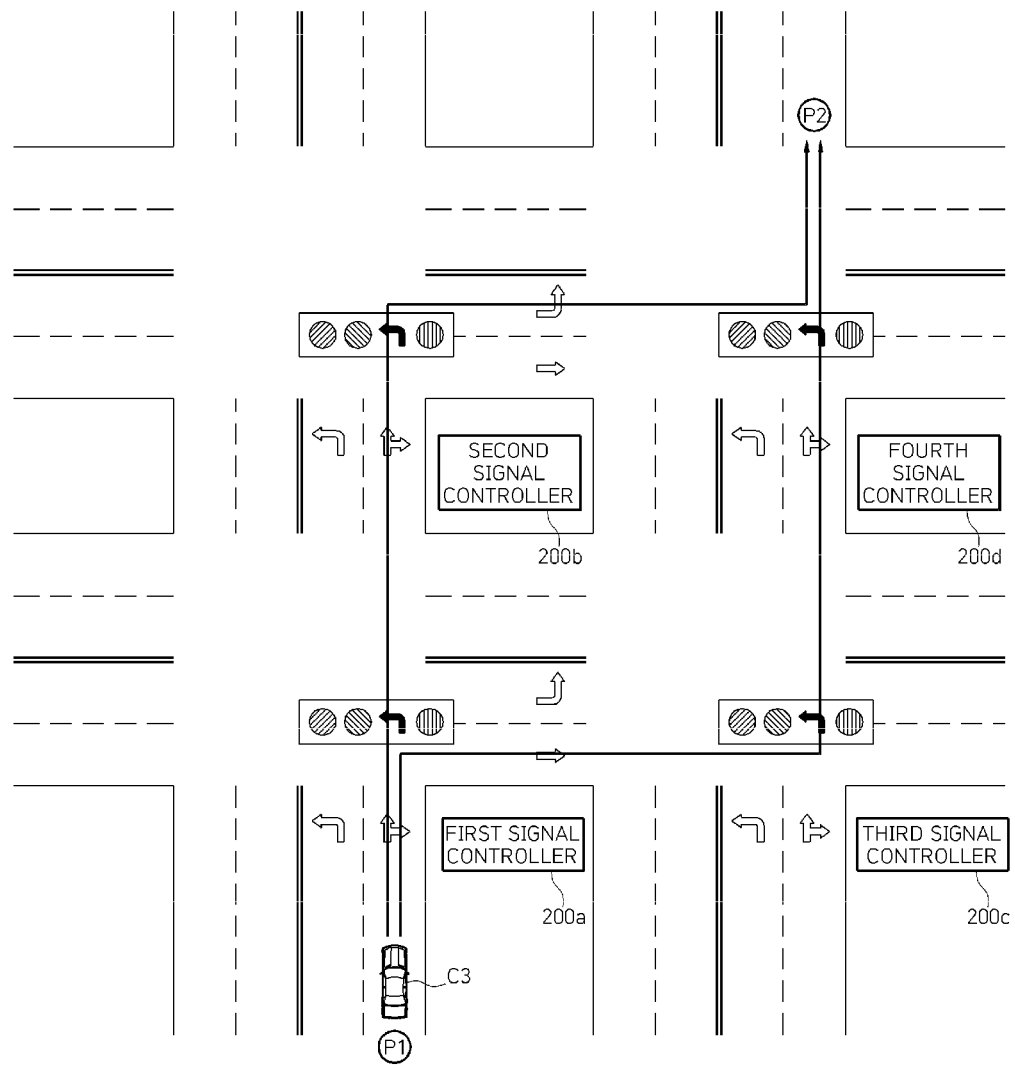

FIGS. 3 to 5 show a V2I communication situation between a signal controller and a vehicle according to an embodiment of the present invention.

A vehicle C3 receives signal information from a signal controller 200, determines a driving behavior in consideration of route information (e.g., turning left) and driving information (a current lane, speed, heading information, etc.) of the vehicle C3, and performs autonomous driving according to the determined driving behavior or provides a guide to the driving behavior to a driver.

While the vehicle C3 receives the signal information from the signal controller 200, the vehicle C3 receives information on the turn-on of a green light for turning left and information on the remaining time of the turn-on of the green light (e.g., information on remaining 10 seconds) as shown in FIG. 3.

The vehicle C3 determines a driving behavior in consideration of the current driving information (speed, etc.) of the vehicle, a spacing distance to an intersection, and traffic-situation-ahead information (a distance to a preceding vehicle, traffic congestion ahead) and performs autonomous driving according to the driving behavior or provides a notification to a driver.

In this case, the vehicle C3 determines a driving behavior to pass through an intersection while maintaining the current speed, pass through an intersection by accelerating relative to the current speed, pass through an intersection by decelerating relative to the current speed, or stop.

A driver notification provides safe driving information or a warning through a human-machine interface (HMI).

Referring to FIG. 3, it is assumed that signal information "green light for turning left" is received by an autonomous vehicle C3 that intends to make a left turn at a corresponding intersection, and it is also assumed that the autonomous vehicle C3 can safely pass through the intersection within the turning-on duration of the green light for turning left when the autonomous vehicle C3 accelerates to 45 km/h and cannot pass through the intersection within the turning-on duration of the green light for turning left when the autonomous vehicle C3 passes at the current speed (30 km/h) considering traffic situation information (the number of preceding vehicles, driving behavior information of preceding vehicles, etc.) including the current speed of the autonomous vehicle C3, a distance to an intersection, an intersection entry section, an intersection region, and an intersection exit section.

At this time, the autonomous vehicle C3 may accelerate to 45 km/h and turn left to pass through the intersection.

However, since the speed limit of a corresponding road is 50 km/h, it is acceptable in terms of the speed limit when the autonomous vehicle C3 accelerates the driving speed to 45 km/h and turns left. However, it is assumed that it is set to avoid the driving behavior because the driver's satisfaction is determined to be low due to a vehicle pulling phenomenon when the vehicle C3 turns left at a preset speed (40 km/h) or more. At this time, the driving behavior is determined such that the autonomous vehicle C3 stops at a corresponding intersection without acceleration. At this point, the green light for turning left is changed to a green light and a red light. The autonomous vehicle C3 transmits, to a following vehicle, driving information indicating that the vehicle does not turn left and stops at the corresponding signal.

In the case of going straight (when an autonomous vehicle intends to go straight while the green light for going straight is turned on) instead of the left-turn situation shown in FIG. 3, the autonomous vehicle passes through an intersection when rapid acceleration is not necessary (e.g., a situation in which the autonomous vehicle can pass through the intersection when increasing the current driving speed from 30 km/h to 45 km/h within five seconds) and stops without acceleration and waits for the next signal when rapid acceleration is necessary (e.g., a situation in which the autonomous vehicle can pass through the intersection when increasing the current driving speed from 30 km/h to 45 km/h within two seconds. At this point, the green light for going straight is changed to a yellow light or a red light. Likewise, the autonomous vehicle C3 transmits, to a following vehicle, driving information indicating that the vehicle does not go straight through the intersection and stops.

That is, the vehicle determines a driving behavior (maintaining the current speed, accelerate, decelerate, or stop) at a corresponding intersection in comprehensive consideration of the current signal information (including a remaining turning-on duration), driving information (the current lane information and the current driving speed), route information (including information on a driving direction), traffic situation information (including a distance to a preceding vehicle, traffic congestion for an area after passing an intersection, etc.), driver satisfaction (standards for rapid acceleration/deceleration when the driving pattern is going straight, and preset standards for vehicle pulling when the driving pattern is turning left or right).

When the signal information received from the signal controller 200 is a yellow light, the vehicle C3 determines a driving behavior for stopping or maintaining the driving in consideration of the current driving speed, a distance to a stop line, and traffic-situation-ahead information (information on traffic situations in an intersection entry area, an intersection area, and an intersection exit area). At this time, when the vehicle C3 is not an autonomous vehicle, the vehicle C3 provides a guide for stopping or traveling to a driver by displaying a message through an HMI.

When the signal information received from the signal controller 200 is a red light, the vehicle C3 stops, acquires information on a waiting time for the next green light, and notifies an occupant of the information.

When the remaining waiting time until the green light turns on is longer than a certain period of time, the vehicle C3 automatically switches the engine to an idle state (stop and go activation) and displays the remaining time until the green light turns on to the driver through the HMI.

When the turning-on time of the green light is imminent, the vehicle C3 switches the engine to an on state and provides the driver with information related to driving resumption.

Referring to FIG. 4, it is assumed that at an intersection with a traffic light, it is not possible to recognize the traffic light using a camera mounted on a third vehicle C3 because the traffic light is obscured by a first vehicle C1, which is a truck, a container, etc. ahead.

An embodiment of the present invention may be applied to a situation in which it is not possible to recognize a traffic light using a camera mounted on a vehicle because of heavy snow, heavy rain, and bad weather as well as a case in which a traffic light is obscured by a vehicle (a first vehicle C1) ahead of a traveling vehicle (the third vehicle C3) as shown in FIG. 3.

The signal controller 200, which displays signals and controls timing, is equipped with a WAVE data handler capable of V2I communication with nearby vehicles and thus may freely transmit and receive information to and from the nearby vehicles.

When it is not possible to recognize a traffic light through a camera, the vehicle C3 activates V2I communication with the signal controller 200.

When a vehicle approaches an intersection, the signal controller 200 recognizes the approach of the vehicle and attempts V2I communication with the vehicle within a certain distance (e.g., a predetermined distance from a stop line, a predetermined distance, and the like). At this time, it is also possible for the vehicle C3 to receive signal information broadcast from the signal controller 200 without a separate communication attempt.

Also, vehicles in an area where a traffic light is not recognized through a camera, such as a vehicle that has crossed a stop line, may also recognize a signal state through V2I communication with the signal controller 200.

The vehicle C3 checks whether the camera recognizes a traffic light when entering a certain range of the intersection entry area.

When it is not possible to recognize a traffic light using a camera, the vehicle C3 attempts V2I communication with the signal controller 200, receives signal information of the traffic light of the corresponding intersection from the signal controller 200, and controls a driving behavior for traveling and stopping.

In this case, the vehicle C3 receives information on a congestion situation at the intersection from the signal controller 200, and the information includes information on the number of preceding vehicles having the same driving direction as the vehicle C3, information on behaviors of preceding vehicles, information on an expected time at which the vehicle will pass through the intersection, and the like.

For example, in FIG. 4, it is assumed that a red light turns on at a first time point.

The signal controller 200 transmits, to the vehicle C3, signal information indicating that the red light turns on at the first time point and that a straight green light will turn on after 30 seconds.

Also, the signal controller 200 transmits, to the vehicle C3, information indicating that the preceding vehicle C1 is expected to move forward three seconds after the green light turns on according to a result of analyzing driving behavior history information of the preceding vehicle C1.

The vehicle C3 may change the engine from an idle state to an on state according to the departure point of the preceding vehicle C1 when the vehicle C3 is an autonomous vehicle and may inform the driver of the signal information and the expected departure time of the preceding vehicle C1 when the vehicle is not an autonomous vehicle.

Also, considering the traffic congestion situation in the intersection area and the intersection exit area, the signal controller 200 transmits a notification indicating "Do not start despite the green light turning on" to the vehicle C3 and the following vehicle to share traffic situation information when the green light is turned on now but the red light will turn on before the vehicle C3 exits the intersection, which is expected to cause an intersection tailback.

The signal controller 200 receives traffic situation information from a signal controller or a server of an intersection located in the vicinity of the intersection and delivers the traffic situation information to the vehicles.

At this time, by transmitting traffic situation information including signal information of an associated intersection (the next intersection that the vehicle is expected to reach) as well as the current intersection to the vehicle C3 in consideration of the driving route of the vehicle C3, it is possible to control a driving behavior (a driving lane, a driving speed, a route keeping, or a route change) by the vehicle C3 reflecting traffic information of a nearby signal intersection in real time while traveling an expected route.

In the case of a signal intersection of an urban or arterial road, the offset of signal controllers may be implemented, and all signal controllers of each intersection may be connected to each other to share traffic information.

Referring to FIG. 5, signal controllers of intersections, i.e., first to fourth signal controllers 200a to 200d, share signal information and traffic situation information.

An intersection where the first signal controller 200a controls signals is defined as a first intersection, and an intersection where the second signal controller 200b controls signals is defined as a second intersection. An intersection where the third signal controller 200c controls signals is defined as a third intersection, and an intersection where the fourth signal controller 200d controls signals is defined as a fourth intersection.

The traffic situation information may be acquired by collecting information received from nearby vehicles at the corresponding intersection or may be acquired from image data obtained by capturing nearby vehicles at the corresponding intersection.

From a point P1 to a point P2 in FIG. 5, the vehicle C3 may travel a route including going straight, turning right, and then turning left (a first route) or a route including turning right, turning left, and going straight (a second route).

In this case, the vehicle determines a route to travel according to a result of collecting the signal information and traffic situation information received from signal controllers 200b, 200c, and 200d at nearby intersections (here, the term "nearby intersection" includes an intersection after the next intersection as well as the next interaction in the driving route) as well as signal information and traffic situation information from the first signal controller 200a at the current intersection (the first intersection).

The vehicle C3 determines the driving route in consideration of traffic congestion information for each traveling lane and performs autonomous driving or provides navigation information to a driver.

For example, in the case of the first route as described above, the vehicle C3 should turn right at the second intersection, change lanes once, and turn left at the fourth intersection. In the case of the second route, the vehicle C3 should turn right at the first intersection, change lanes, turn left at the third intersection, change lanes once, and then go straight at the fourth intersection.

At this time, depending on a traffic situation such as the number of vehicles in a right turn lane at the second intersection, the number of vehicles in a left turn lane between the first intersection and the third intersection, etc., the difficulty of lane change and an estimated time to a destination are calculated.

The vehicle C3 calculates an optical route and determines a driving behavior in comprehensive consideration of signal information and traffic situation information received from the first signal controller 200a to the fourth signal controller 200d.

Figure 6:
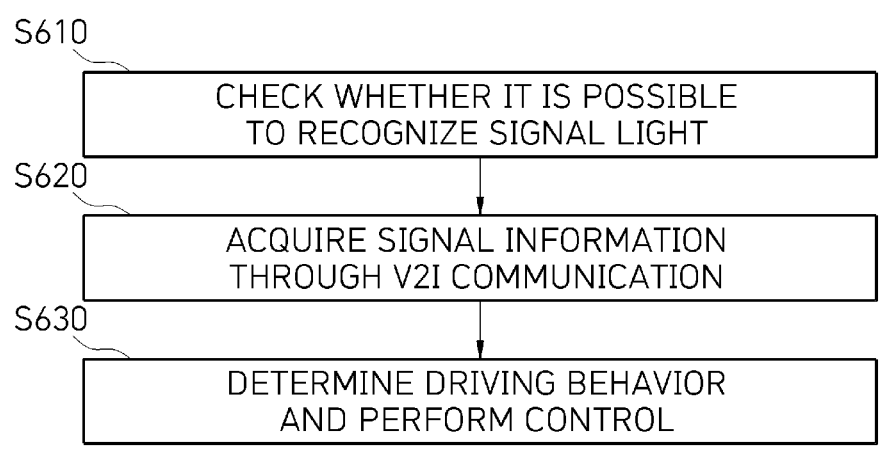
FIG. 6 is a flowchart illustrating a driving guide method according to an embodiment of the present invention.

FIG. 6 is a flowchart illustrating a driving guide method according to an embodiment of the present invention.

The driving guide method according to an embodiment of the present invention includes checking whether it is possible to recognize a traffic light using a camera (S610), acquiring signal information through V2I communication (S620) when it is not possible to recognize the traffic light using the camera, and determining a driving behavior in consideration of the signal information and performing control according to the driving behavior (S630).

In operation S610, when it is determined that it is not possible to recognize a traffic light using a camera, a V2I communication module is activated for communication with a signal controller.

In operation S620, the signal information including at least one of information on the currently turned-on signal, information on the remaining turning-on duration of the currently turned-on signal, and information on the remaining waiting time until a signal turning-on time for a vehicle's driving route is received from the signal controller.

In operation S630, a driving behavior is determined in consideration of the signal information, and autonomous driving is performed according to the determined driving behavior, or information regarding the determined driving behavior is provided to a driver.

In operation S620, information on a traffic situation ahead including traffic situation information at a corresponding intersection is received from the signal controller. In this case, the traffic-situation-ahead information includes at least one of information on the number of preceding vehicles having the same driving route as a vehicle, information on behaviors of preceding vehicles, and information on an expected time at which a vehicle will pass through the intersection.

In operation S630, the driving behavior is determined in consideration of the signal information, the vehicle's driving information, the traffic-situation-ahead information, and driver satisfaction information.

In S620, signal information and traffic situation information are received from a signal controller at a nearby intersection other than the current intersection. In operation S630, the vehicle's driving behavior is determined in consideration of the signal information and the traffic situation information.

Figure 7:
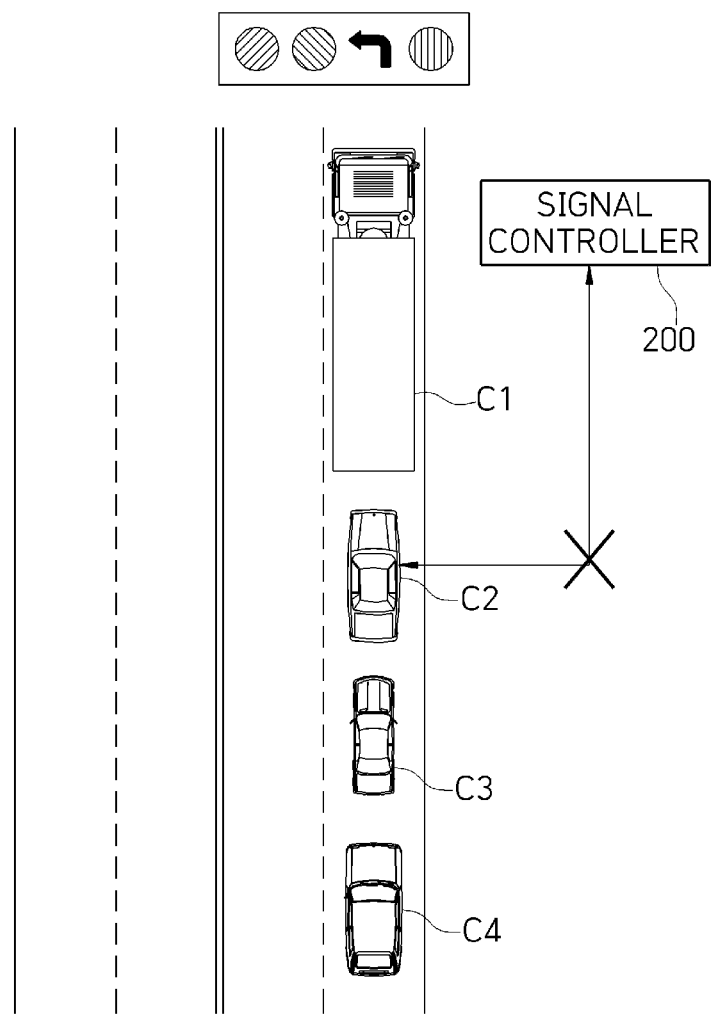
FIGS. 7 and 8 show a driving guide situation according to another embodiment of the present invention.

FIG. 7 shows a driving guide situation according to another embodiment of the present invention.

This is a situation in which a first vehicle C1, a second vehicle C2, a third vehicle C3, and a fourth vehicle C4 are waiting for a signal change sequentially with respect to the location of a traffic light.

The first vehicle C1 is a truck, and the height of the first vehicle C1 obscures the field of vision of the second vehicle C2 behind, and it is not possible to recognize the traffic light using a camera mounted on the second vehicle C2.

However, due to a communication failure with a signal controller 200, it is not possible for the second vehicle C2 to receive signal information from the signal controller 200.

At this time, the third vehicle C3, which is spaced a certain distance from the first vehicle C1 and is able to recognize the traffic light using a camera, becomes a traffic-light recognition vehicle and broadcasts recognized signal information to nearby vehicles.

Thus, the fourth vehicle C4 behind the third vehicle C3 as well as the first vehicle C1 and the second vehicle C2 also recognize a signal according to the signal information received from the third vehicle C3 and determine a driving behavior.

When the first to fourth vehicles C1 to C4, which have been described above, intend to go straight and the signal is changed from a red light to a green light, the third vehicle C3 provides a notification indicating the green light is turned on to the first vehicle C1, the second vehicle C2, and the fourth vehicle C4, as described above.

In this case, according to the traffic-situation-ahead information acquired by the first vehicle C1, for example, when the green light is turned on but vehicles cannot enter an intersection, such as when an intersection tailback occurs, when a pedestrian is still crossing, when an accident has occurred, or when a concession is required due to an emergency vehicle, the first vehicle C1 broadcasts and provides the traffic-situation-ahead information as feedback for a start notification caused by the turning-on of the green light.

By receiving the feedback from the first vehicle C1 and recognizing a traffic situation ahead, the second to fourth vehicles C2 to C4 may check information on a driving behavior of the first vehicle C1 which does not start despite the turning-on of the green light.

In the case of a congested intersection, information transmitted and received by many vehicles in real time does not contain a lot of meaningful information for an actual safe driving guide and causes a communication load, which can lead to a communication failure state.

Vehicles entering an intersection collect congestion information of the corresponding intersection through V2V communication.

Based on the congestion information, a vehicle may check whether it is the most preceding vehicle (the first vehicle C1 in FIG. 7) among vehicles waiting for a signal change at a traffic light or may check whether it is a vehicle (the third vehicle C3 in FIG. 7) that can recognize a traffic light ahead through a camera.

When the vehicle is a vehicle capable of recognizing a traffic light (the third vehicle C3 in FIG. 7) or a vehicle capable of checking a traffic situation ahead (the first vehicle C1 in FIG. 7), the vehicle transmits a request for the deactivation of a transmission module (TX OFF Event) to nearby vehicles C2 and CX4 as a broadcasting message.

After the message is received, the nearby vehicles C2 and C4 deactivate their own transmission modules and keep only reception modules activated.

An example of acquiring signal information from the third vehicle C3, which is behind, when the second vehicle C2 does not recognize the traffic light since the first vehicle C1 obscures the traffic light, has been described above.

However, when only the first vehicle C1 and the second vehicle C2 are present, no vehicle capable of recognizing a traffic light (C3 in FIG. 7) is behind the second vehicle C2. Thus, the second vehicle C2 cannot recognize a traffic light using a camera and also cannot recognize a traffic light using V2I (as described above, the communication failure situation of the signal controller is assumed).

At this time, a second signal controller disposed at an intersection near the current intersection recognizes the communication failure situation of the signal controller of the current intersection and provides signal information of the current intersection to the second vehicle C2.

That is, instead of the signal controller 200 of the current intersection, the second signal controller provides the second vehicle C2 with the signal information of the current intersection to be provided by the signal controller 200.

The second signal controller inquires about signal information of the signal controller 200 of the current intersection linked to its own signal information and provides the signal information to the second vehicle C2.

Figure 8:
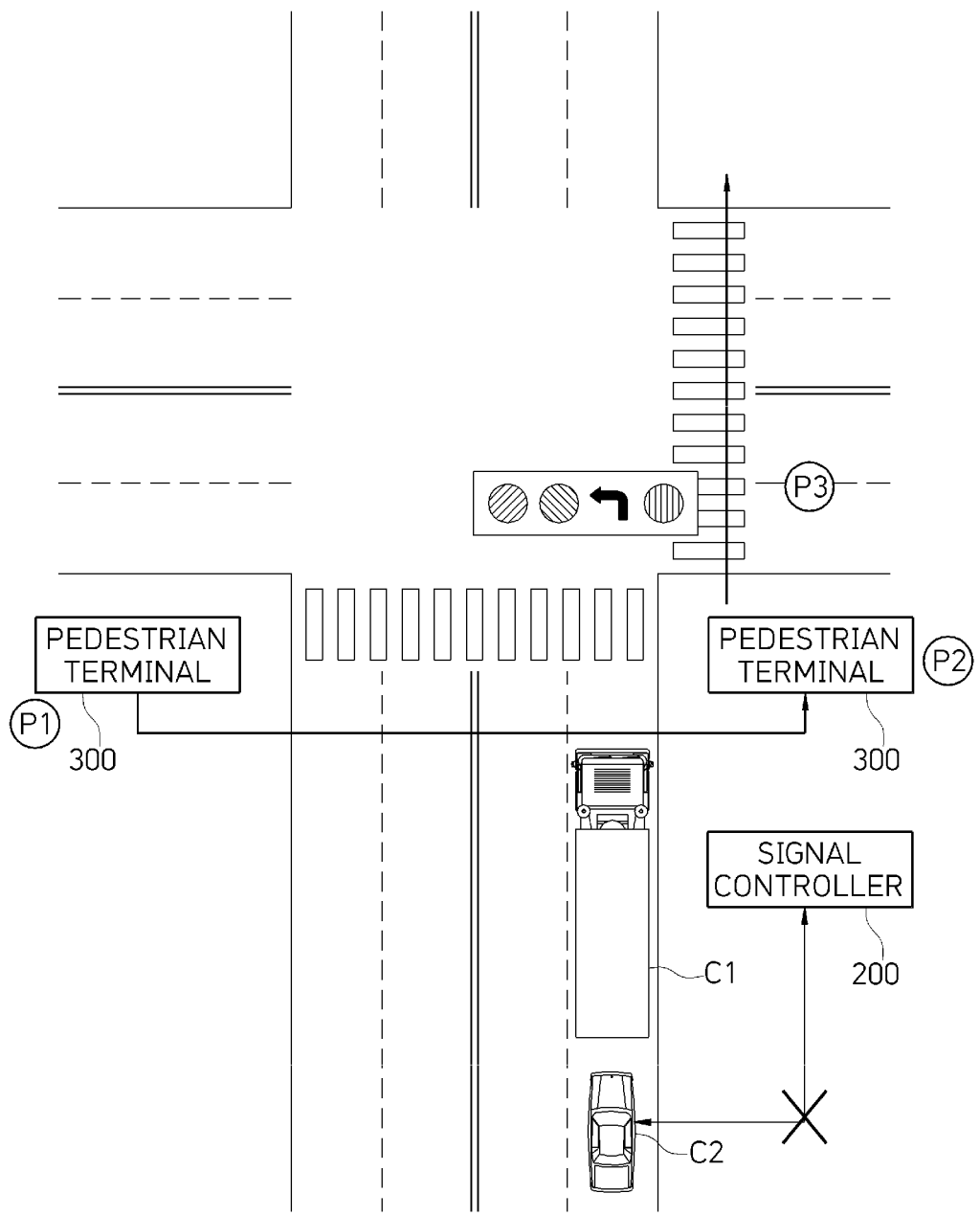

FIG. 8 shows a driving guide situation according to another embodiment of the present invention.

Referring to FIG. 8, only the first vehicle C1 and the second vehicle C2 are present, and thus no vehicle capable of recognizing a traffic light is behind the second vehicle C2. Accordingly, it is assumed that the second vehicle C2 cannot recognize a traffic light using a camera, cannot acquire a signal information through communication with the second controller 200 using V2I, and also cannot acquire signal information through communication with the second signal controller disposed at the nearby intersection (e.g., a case in which signal information cannot be acquired due to a long spacing distance from the second signal controller).

At this time, the second vehicle C2 switches to a 5G-based cellular vehicle-to-everything (C-V2X) communication mode (the second vehicle is equipped with a communication terminal of a hybrid mode that operates based on both WAVE and Cellular. The second vehicle C2 collects information broadcast from a nearby pedestrian terminal or bicycle and extracts signal information of the current intersection. Accordingly, the second vehicle C2 determines a driving behavior and then performs autonomous driving according to the driving behavior or provides a driver with a notification about the driving behavior.

For example, the second vehicle C2 acquires location information and route information from a terminal 300 of a pedestrian who crosses the current intersection and acquires information on the current pedestrian signal from the location information and the route information.

That is, the second vehicle C2, which receives information on a situation in which the pedestrian terminal 300 starts to move at a point P1 and the location of the pedestrian terminal 300 is changed to a point P2, is aware of a situation in which the pedestrian is crossing an intersection ahead.

Subsequently, the second vehicle C2, which receives information on a situation in which the pedestrian terminal 300 starts to move at the point P2 and the location of the pedestrian terminal 300 is changed to a point P3, is aware of a situation in which a green light is turned on at the current intersection.

That is, through C-V2X communication with terminals near the current intersection, the vehicle checks behavior states of the terminals and is aware of situation information of signal flow at the corresponding intersection.

The above-described driving guide system according to another embodiment of the present invention includes an input unit which receives signal information, a memory in which a driving guide program using the signal information is embedded, and a processor which executes the program, wherein the processor receives the signal information and determines a driving behavior when it is not possible to recognize a traffic light using a camera and it is also not possible to receive information on a traffic light from an infrastructure.

The input unit receives signal information from a traffic-light recognition vehicle.

The input unit receives signal information from a signal controller of a nearby intersection connected to the current intersection.

The processor determines a driving behavior using the signal information. The process determines a driving behavior using feedback information which is of a traffic situation ahead and which is received from a preceding vehicle.

The input unit receives a request to deactivate a transmission module from at least one of the traffic light recognition vehicle and the preceding vehicle and deactivates the transmission module.

The input unit receives location information of a terminal held by a pedestrian at an intersection, and the process estimates a traffic light situation at the corresponding intersection according to the location information of the terminal and accordingly determines a driving behavior.

The above-described driving guide method according to another embodiment of the present invention includes (a) receiving signal information at a current intersection or estimating signal information using location information received from a pedestrian terminal at the current intersection, and (b) determining a driving behavior according to the signal information and performing vehicle control.

In operation (a), signal information is received from a vehicle that can recognize a traffic light or a signal controller of a nearby intersection connected to the current intersection.

In operation (b), a driving behavior is determined in consideration of feedback information which is of a traffic situation ahead and which is received from a preceding vehicle.

In operation (a), signal information at the current intersection is estimated in consideration of a change in the location information of the pedestrian terminal.

Figure 9:
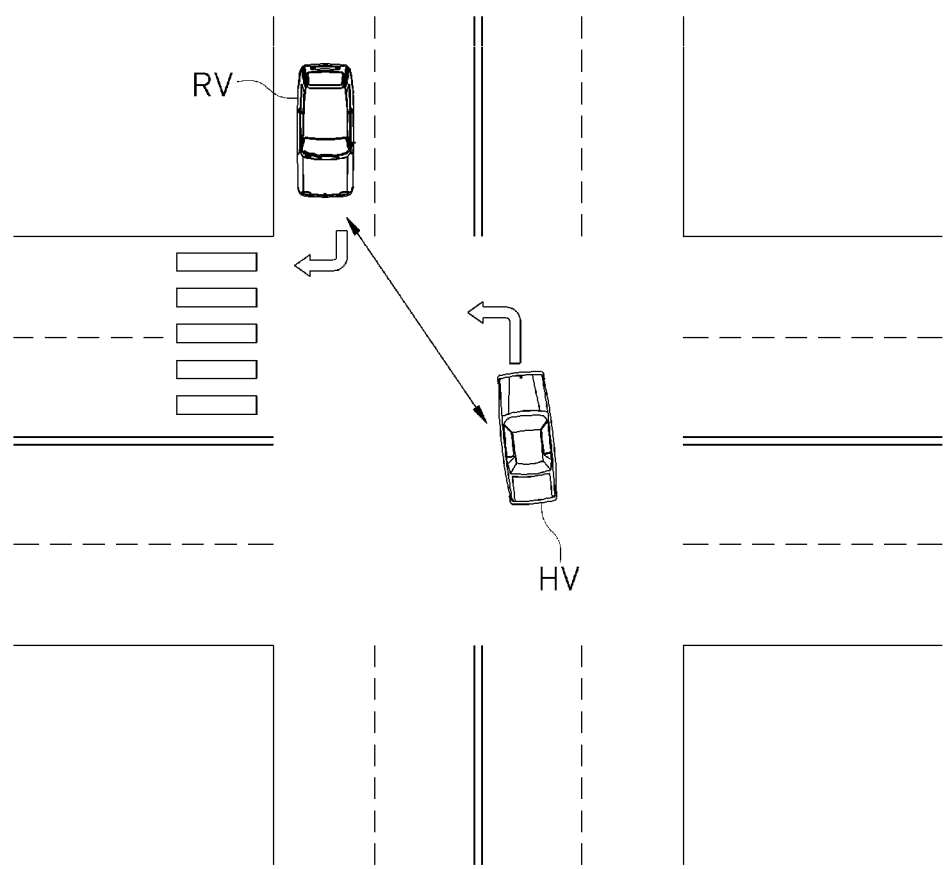
FIG. 9 shows a driving guide in a left-turning situation according to another embodiment of the present invention.

FIG. 9 shows a driving guide in a left-turning situation according to another embodiment of the present invention.

A host vehicle HV approaches a current intersection to make a left turn at the current intersection and checks whether the corresponding intersection is a signal intersection or a non-signal intersection using map information.

In this case, the host vehicle HV may acquire intersection type information from an infrastructure (a V2I base station) installed near a road.

Also, the host vehicle HV may acquire intersection type information from a traffic light installed at the intersection, a stop sign, or the like through a camera that acquires an image of an area ahead.

n order to acquire the intersection type information, a method of using map information, a method of receiving corresponding information from an infrastructure, and a method of acquiring corresponding information through a front camera may be used in a fusion scheme or utilized in a fail/safe scheme.

When it is determined that the corresponding intersection is a signal intersection, the host vehicle HV determines whether to activate a left-turn collision warning system. In this case, the host vehicle HV receives signal information ("green light for turning left," "yellow light," and "red light") from the V2I base station installed at the intersection and checks whether the host vehicle HV is in a left-turn lane.

In this case, the lane check may be performed using map information and GPS information. When the host vehicle HV is in the left-turn lane and receives signal information on the green light for turning left, the host vehicle HV activates the left-turn collision warning system. When the host vehicle HV determines that the corresponding intersection is a non-signal intersection, the host vehicle HV activates the left-turn collision warning system when passing a stop line or when turning on a left turn blinker.

The host vehicle HV receives information on an expected route of a vehicle classified as being likely to collide with the host vehicle HV among nearby vehicles RV through V2V communication.

In this case, the host vehicle HV receives time-based expected-route information (i.e., an expected route after n seconds) from a warning prediction module of a nearby vehicle RV.

The host vehicle HV calculates time-based expected-route information (i.e., an expected route after n seconds) using its own driving information such as velocity and steering angle.

The host vehicle HV determines a possibility of collision by using its own time-based expected-route information and time-based expected-route information of the nearby vehicle RV.

Also, the host vehicle HV determines a possibility of collision with the nearby vehicle RV by analyzing image data acquired from the front camera.

The host vehicle HV considers both the collision possibility using the expected-route information and the collision possibility based on the image data analysis and activates a collision avoidance function when the collision possibility is greater than or equal to a preset criterion.

Each of the host vehicle HV and the nearby vehicle RV determines driving priority in comprehensive consideration of the current speed, a distance to an intersection, an intersection type, signal information of a traffic light, etc. and determines a driving behavior according to the determined priority.

For example, it is assumed that the current intersection is an intersection with a traffic light and the host vehicle HV turns left according to signal information "green light for turning left."

At this time, the host vehicle (HV) is given a higher driving priority than the nearby vehicle RV. Accordingly, the driving behaviors of the host vehicle HV and the nearby vehicle RV are determined such that the nearby vehicle RV turns right after the host vehicle HV turns left and exits the intersection.

Also, when the host vehicle HV turns left according to the signal information "green light for turning left" and the nearby vehicle RV makes a right turn before the green light for turning left is turned on, the driving behaviors of the host vehicle HV and the nearby vehicle RV are determined such that the host vehicle HV turns left after the nearby vehicle RV turns right and exits the intersection.

It is assumed that the current intersection is an intersection with a traffic light but is an "unprotected left-turn section."

The host vehicle HV and the nearby vehicle RV share driving history information, and the driving priority is determined in consideration of the driving history information as well as the current speed, the distance to the intersection, the intersection type, and the signal information of the traffic light of the intersection which have described above.

For example, it is assumed that the spacing distance between the host vehicle HV waiting at a stop line to turn left at an intersection and a nearby vehicle is greater than or equal to a preset distance and the driving history information of the host vehicle HV includes a history of completing an unprotected left turn without a collision accident when the driving speed of the nearby vehicle RV is less than or equal to a certain speed.

At this time, the driving behaviors of the host vehicle HV and the nearby vehicle RV are determined according to the priority determination considering the driving history information such that the host vehicle makes an unprotected left turn first and then the nearby vehicle RV turns right.

The driving history information may be used to determine the driving behavior according to the average of the driving history information or by applying a larger weight to a recent driving history than to a relatively old driving history.

The host vehicle HV may be prepared in case expected-route information of a nearby vehicle is not properly received through V2V communication due to a communication failure or the like or in case the reliability of image recognition using a camera is not secured due to bad weather, obstacles, etc. and may make use for the purpose of a fail-safe.

The host vehicle HV and the nearby vehicle RV are equipped with an integrated terminal for WAVE and C-V2X, and a smartphone held by a pedestrian is equipped with a C-V2X function.

The host vehicle HV detects a collision risk with a pedestrian crossing an intersection while the vehicle turns as well as avoiding a collision with a nearby vehicle RV in a left turn situation as described above.

The smartphone held by the pedestrian broadcasts its location information in real time, and the host vehicle HV, the signal controller, and the nearby vehicle RV receive this location information.

The host vehicle HV computes the risk of a collision in real time using the expected-route information of the host vehicle HV and the location information of the pedestrian received from the smartphone held by the pedestrian.

When a pedestrian is crossing a crosswalk with the pedestrian signal being a green light, but the host vehicle HV or the nearby vehicles RV approaches up to a preset distance from the crosswalk, a warning notification is provided to the host vehicle HV, the nearby vehicle RV, and the smartphone held by the pedestrian.

Also, when the pedestrian jaywalks, a warning notification is provided to the host vehicle HV, the nearby vehicle RV, and the smartphone held by the pedestrian.

The above-described driving guide system according to another embodiment of the present invention includes an input unit which receives an image of an area ahead, a memory in which a driving guide program using a result of analyzing the image of the area ahead and expected-route information is embedded, and a processor which executes the program, wherein the processor determines a driving behavior in comprehensive consideration of expected-route information of a host vehicle, expected-route information of a nearby vehicle, and the result of analyzing the image of the area ahead.

The input unit receives time-based expected-route information of a nearby vehicle through V2V communication.

The processor calculates the time-based expected-route information of the host vehicle using driving information of the host vehicle.

The processor determines driving priority related to the nearby vehicle in consideration of intersection type information and intersection traffic-light signal information and then determines a driving behavior according to the priority.

The processor determines a driving behavior in consideration of driving history information.

The above-described driving guide method according to another embodiment of the present invention includes (a) transmitting driving information of a host vehicle, (b) receiving driving information of a nearby vehicle, and (c) determining a driving behavior of the host vehicle and performing control corresponding to the determined driving behavior.

In operation (a), the host vehicle transmits a location, heading information, an expected-driving route, and occupant information (e.g., the number of occupants) of the host vehicle to a nearby vehicle equipped with a Dedicated Short-Range Communication (DSRC) WAVE module through DSRC WAVE and transmits the corresponding information to an infrastructure through V2I. In this case, the expected driving route includes time-based information on the location of the host vehicle.

Also, in operation (a), the host vehicle transmits the driving information of the host vehicle to devices equipped with a cellular module through a cellular network.

A nearby vehicle equipped with a DSRC WAVE terminal broadcasts the location, heading information, expected driving route, and occupant information of the nearby vehicle, and the host vehicle receives the driving information of the nearby vehicle in operation (b). In this case, the expected driving route includes time-based information on the location of the nearby vehicle.

In operation (b), the host vehicle additionally receives a location of a pedestrian, an expected route, etc. from the pedestrian terminal equipped with a cellular module in addition to the driving information of the nearby vehicle.

In operation (c), the host vehicle determines a driving behavior using the driving information of the host vehicle, the driving information of the nearby vehicle, and the information received from the pedestrian terminal.

When there is a collision risk with a nearby vehicle or a pedestrian, the host vehicle performs emergency braking or provides a warning alarm to the driver.

In operation (c), the host vehicle determines driving priority according to the collision risk, and at this time, the priority is determined in consideration of an intersection type, signal information, and driving history information.

For example, in the case of a pedestrian and a vehicle, the pedestrian may be given priority, and the driving behavior of the vehicle may be determined such that the vehicle travels after the crossing of the pedestrian is completed. Also, a vehicle with a relatively larger number of occupants is given priority.

In operation (c), the host vehicle may change the intensity of the warning notification in consideration of the movement route of the pedestrian and may change the driving route of the host vehicle in consideration of the driving route of the nearby vehicle or the movement route of the pedestrian.

Also, when pedestrian movement information is received from the pedestrian through cellular communication, the host vehicle delivers the information to the nearby vehicle through DSRC WAVE communication to provide a warning about the pedestrian crossing.

A driving guide system according to another embodiment of the present invention will be described below.

When a host vehicle HV and a nearby vehicle RV calculate expected-route information based on map information and a GPS module and determine the collision risk, a distance error may occur, which may cause a problem especially in an urban environment with high-rise buildings.

When the current location is in the urban environment with high-rise buildings, the host vehicle HV and the nearby vehicle RV activate ultra-wideband (UWB) communication in addition to the above-described WAVE and C-V2X.

When the spacing distance between the host vehicle HV and the nearby vehicle RV is less than or equal to a preset distance, the host vehicle HV and the nearby vehicle RV activate UWB communication, calculate mutual location information through UWB communication to determine the collision risk, and determine a driving behavior or transmits a warning notification.

UWB communication is advantageous in terms of power consumption and speed, has low interference due to broadband and low power, and has robustness against multipath fading. Also, UWB communication, which uses a baseband transmission method, does not require an RF/IF conversion stage, a local oscillator, a mixer, or the like. Thus, advantageously, UWB has low implementation complexity and good obstacle transmittance.

The host vehicle HV and the nearby vehicle RV calculate a collision risk based on WAVE and C-V2X as described above and define this result as a first calculated collision risk value.

When the spacing distance is less than or equal to the preset distance, the host vehicle HV and the nearby vehicle RV share location information through UWB communication, compute a collision risk based on the location information, and define this result as a second calculated collision risk value.

When the difference between the first calculated collision risk value and the second calculated collision risk value is greater than or equal to a preset criterion, the host vehicle HV and the nearby vehicle RV switch a communication method or perform controls in a fail-safe mode.

When a WAVE/C-V2X terminal of a currently traveling vehicle detects frequency band overlap or noise in other bands, the vehicle monitors this event as a communication error and takes advantage of UWB communication's robustness against jamming by switching WAVE/C-V2X communication mode into a standby state or a second priority state.

When an error is detected in the power of the WAVE/C-V2X terminal of the currently traveling vehicle (e.g., reset is repeated, or the abnormal standby current is detected), when an error occurs in CAN communication for transmitting various kinds of vehicle and location information (an error signal is detected in the CAN communication, data being exchanged is broken, etc.), or when an error is detected in an RF signal received from a vehicle antenna (roof integrated antenna), the vehicle urgently switches to the fail-safe mode according to the event detection and determines a collision possibility through UWB communication instead of the WAVE/C-V2X terminal.

The above-described driving guide system according to another embodiment of the present invention includes an input unit which receives location information from a GPS module, a memory in which a driving guide program is embedded, and a processor that executes the program, wherein the processor determines a communication mode in consideration of the location information and reception sensitivity, calculates a possibility of collision with a nearby vehicle, and determines a driving behavior of the host vehicle.

When the reception sensitivity of the GPS module is less than or equal to a preset criterion, the processor activates a UWB communication module to calculate a relative location from the nearby vehicle and determines a driving behavior of the host vehicle in consideration of a possibility of collision corresponding to the relative location.

The processor determines a communication mode in consideration of the difference between the spacing distance from the nearby vehicle which is calculated based on the location information received from the GPS module and the spacing distance from the nearby vehicle which is calculated using the UWB communication module.

The processor determines driving priority related to the nearby vehicle in consideration of intersection type information and intersection traffic-light signal information and then determines a driving behavior according to the priority.

The processor determines a driving behavior in consideration of driving history information.

The above-described driving guide method according to another embodiment of the present invention includes (a) monitoring a location information acquisition module and (b) determining a communication mode as a result of monitoring the location information acquisition module, calculating a collision risk with a nearby vehicle using data acquired according to the determined communication mode, and determining a driving behavior of a host vehicle to perform control.

In operation (a), the reception sensitivity of the GPS module is monitored.

In operation (b), when it is determined that the location information using the location information acquisition module is inaccurate, a UWB module is activated to acquire a distance from the nearby vehicle and calculates a collision risk.

In operation (b), driving priority related to the nearby vehicle is determined in consideration of intersection type information and intersection traffic-light signal information and then a driving behavior is determined according to the priority.

Meanwhile, the driving guide method according to an embodiment of the present invention may be implemented in a computer system or recorded on a recording medium. The computer system may include at least one processor, memory, user input device, data communication bus, user output device, and storage. The above-described elements perform data communication through the data communication bus.

The computer system may further include a network interface coupled to a network. The processor may be a central processing unit (CPU) or a semiconductor device for processing instructions stored in a memory and/or a storage.

The memory and storage may include various types of volatile or non-volatile storage media. For example, the memory may include a read-only memory (ROM) and a random access memory (RAM).

Accordingly, the driving guide method according to an embodiment of the present invention may be implemented as a computer-executable method. When the driving guide method according to an embodiment of the present invention is performed by a computer device, computer-readable instructions may implement the driving guide method according to an embodiment of the present invention.

Meanwhile, the driving guide method according to the present invention may be embodied as computer-readable code on a computer-readable recording medium. The computer-readable recording medium includes all types of recording media where data that can be decrypted by a computer system is stored. For example, the computer-readable recording medium may include a ROM, a RAM, a magnetic tape, a magnetic disk, a flash memory, an optical data storage device, and the like. Further, the computer-readable recording media can be stored and carried out as codes that are distributed in a computer system connected to a computer network and are readable in a distributed manner.

According to an embodiment of the present invention, it is possible to accurately recognize a signal state based on vehicle-to-infrastructure (V2I) technology in situations where signal recognition using a camera is not possible due to a truck ahead or the like.

t is possible to calculate an expected departure time in consideration of situation-ahead information (e.g., the number of vehicles ahead, driving behaviors of vehicles ahead, etc.) while waiting for a signal change.

By sharing traffic information between intersection infrastructures, it is possible to provide real-time traffic situation information associated with driving routes to a vehicle waiting for a signal change at an intersection.

Advantageous effects of the present invention are not limited to the aforementioned effects, and other effects not described herein will be clearly understood by those skilled in the art from the above description.

The present invention has been described above with respect to embodiments thereof. Those skilled in the art should understand that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

What is claimed is:

1. A driving guide system, comprising:
    a processor;
    a non-transitory computer-readable medium in communication with the processor and storing instructions that, when executed by the processor, cause the processor to control the driving guide system to perform:
        checking whether a camera of a host device recognizes a traffic light at an intersections;
        in response to the camera not being able to recognize traffic light, receiving, from a traffic signal controller via a communication network, traffic signal information;
        determining, based on the received traffic signal information, a driving behavior for the host vehicle; and
        autonomously driving the host vehicle based on the determined driving behavior.

2. The driving guide system of claim 1, wherein, when it is determined that the captured traffic light is not recognizable, the instructions, when executed by the processor, further cause the processor to control the driving guide system to perform a vehicle-to-infrastructure (V2I) communication with the traffic signal controller.

3. The driving guide system of claim 1, wherein the received traffic signal information includes at least one of a currently turned-on traffic signal, a remaining turning-on duration of the currently turned-on traffic signal, and a remaining waiting time until a next traffic signal turning-on time.

4. The driving guide system of claim 1, wherein the received traffic signal information includes traffic situation information indicating a traffic situation at the intersection.

5. The driving guide system of claim 4, wherein the instructions, when executed by the processor, further cause the processor to control the driving guide system to perform determining the driving behavior further based on driving information of the host vehicle and the traffic situation information.

6. The driving guide system of claim 5, wherein the instructions, when executed by the processor, further cause the processor to control the driving guide system to perform determining the driving behavior further based on preset driver satisfaction information.

7. The driving guide system of claim 5, wherein the traffic situation information including at least one of a number of preceding vehicles having the same driving path as that of the host vehicle, behaviors of the preceding vehicles, and an estimated intersection passing time at which the host vehicle is estimated to pass through the intersection.

8. The driving guide system of claim 5, wherein the intersection is a nearby intersection that is not a current intersection.

9. A method for providing a driving guide for a host vehicle, the method comprising:
    checking whether a camera of the host vehicle; recognizes a traffic light at an intersection; and
    in response to the camera of the host device not being able to recognize the traffic light, performing a vehicle-to-infrastructure (V2I) communication with a traffic signal controller to receive traffic signal information;
    determining, based on the received traffic signal information, a driving behavior for the host vehicle; and
    autonomously driving the host vehicle based on the determined driving behavior.

10. The method of claim 9, wherein, the received traffic signal information includes at least one of a currently turned-on traffic signal, a remaining turning-on duration of the currently turned-on traffic signal, and a remaining waiting time until a next traffic signal turning-on time.

11. The method of claim 9, further comprising providing, via a human-machine interface (HMI) of the host vehicle, information related to the driving behavior.

12. The method of claim 9, wherein the received traffic signal information includes traffic situation information which includes at least one of a number of preceding vehicles having the same driving path as that of the host vehicle, behaviors of the preceding vehicles, and an estimated intersection passing time at which the host vehicle is estimated to pass through the intersection.

13. The method of claim 12, wherein the driving behavior is determined further based on driving information of the host vehicle, the traffic situation information, and preset driver satisfaction information.

14. The method of claim 9, wherein the intersection is a nearby intersection that is not a current intersection.

* * * * *